United States Patent [19]
Bratt

[11] Patent Number: 4,744,900
[45] Date of Patent: May 17, 1988

[54] REVERSE OSMOSIS MEMBRANE CONTAINER

[76] Inventor: Russell I. Bratt, 2431 Laguna Dr., Ft. Lauderdale, Fla. 33316

[21] Appl. No.: 40,309

[22] Filed: Apr. 20, 1987

[51] Int. Cl.⁴ ............................................. B01D 13/00
[52] U.S. Cl. .......................... 210/321.78; 210/321.87
[58] Field of Search ................................ 210/652–655, 210/257.2, 433.2, 321.1, 321.78, 321.87

[56] References Cited

U.S. PATENT DOCUMENTS

| | | | |
|---|---|---|---|
| 4,064,052 | 12/1977 | Zimmerly | 210/433.2 |
| 4,301,013 | 11/1981 | Setti et al. | 210/433.2 |
| 4,451,369 | 5/1984 | Sekino et al. | 210/321.1 |
| 4,600,512 | 7/1986 | Aid | 210/433.2 |

*Primary Examiner*—Ivars Cintins
*Attorney, Agent, or Firm*—Bayard H. Michael; Michael, Best & Friedrich

[57] ABSTRACT

The reverse osmosis membrane is mounted inside a tubular container and has a central passage which connects at each end to a central conduit in the associated end cap. One conduit is plugged and the other is the clear product outlet. Sea or brackish water enters an inlet in one end cap and passes through the membrane to leave via an outlet in the other end cap. The end cap in the inlet end of the container is sealed with respect to the container so sea water must flow through the RO membrane rather than between the membrane and the container. The other end cap is not so sealed and outlet sea water can flow into the space between the RO member and the tubular container. A very small bleed hole allows inlet sea water to by-pass the RO member and flow from the inlet into the space between the member and the container. The low volume flow flushes the space to prevent build-up of algae and the like.

1 Claim, 1 Drawing Sheet

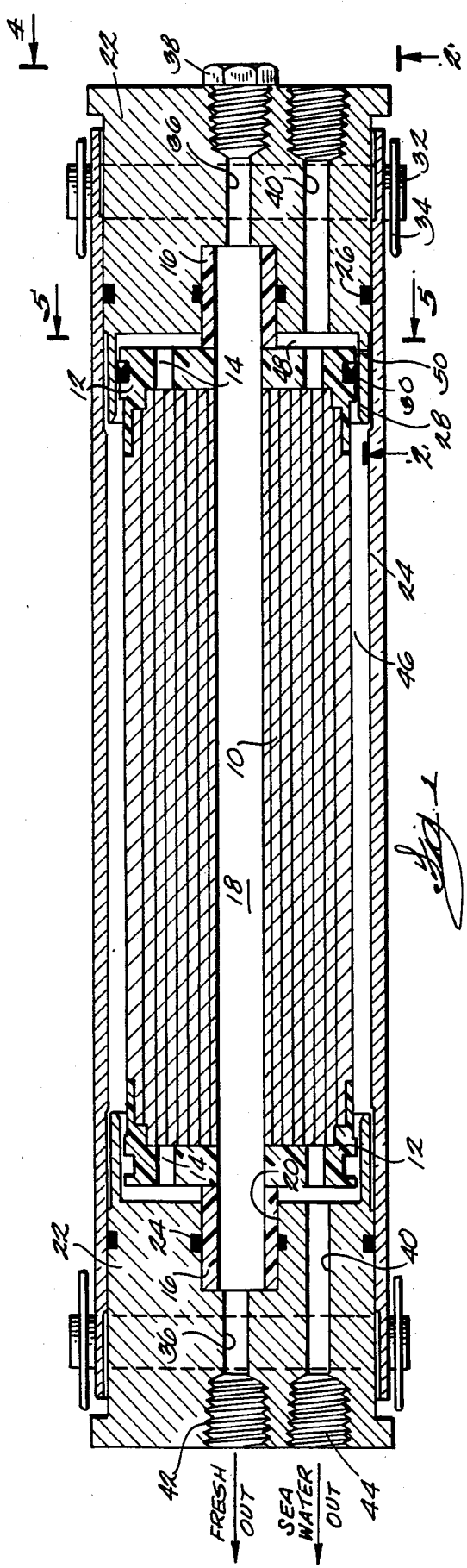
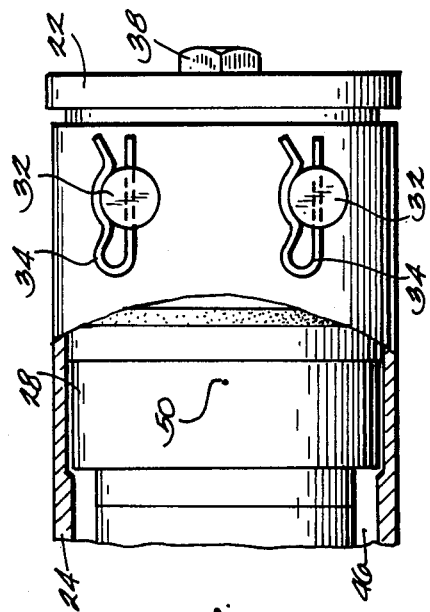
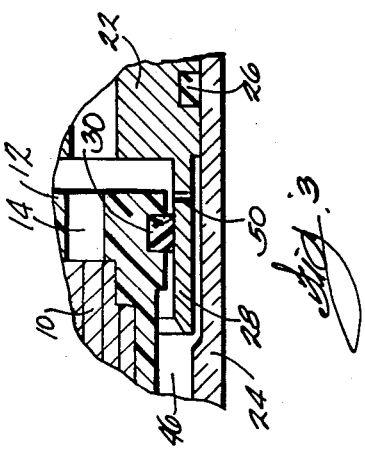
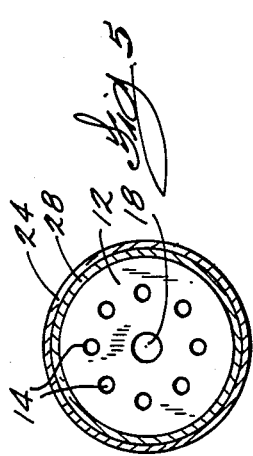
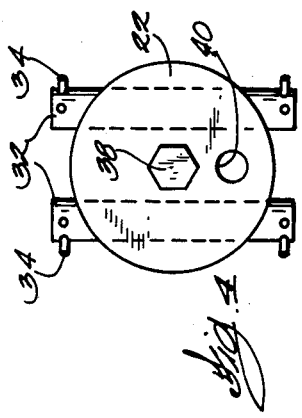

REVERSE OSMOSIS MEMBRANE CONTAINER

BACKGROUND OF THE INVENTION

Reverse osmosis membranes are enclosed in a container or vessel when in use. When the membrane is utilized for desalination or, more correctly, for providing potable water there is brine or brackish water in the membrane and on the interior of the vessel. Salt water or brackish water contains various micro-organisms or the like which, if given time to develop, can produce a rather repulsive growth, typically rather slimy black stuff which does not appear in the potable water outlet but which tends to deposit on the vessel and the membrane and tends to generally foul up the system when it is necessary to service the membrane.

The slimy, algae-like growth has an offensive smell and appearance which can be tolerated under service conditions if that is all there is to it. But, as this growth develops it develops the ability to attack stainless steel of a grade which in normal use in salt water remains quite clean and serviceable. The slimy deposit attacks and pits the stainless steel and has limited the use of stainless steel in membrane containers even though such vessels would offer many advantages if they can be kept free of the pitting.

SUMMARY OF THE INVENTION

The principal object of this invention is to provide a vessel to contain a reverse osmosis membrane in a manner which eliminates or minimizes the development of the growth of algae and other offensive and harmful deposits within the vessel.

I have discovered that a very small flow rate in the vessel through the space between the membrane and the container, where there usually is no flow, will eliminate the growth of bacteria and other micro-organisms. This, therefore, eliminates the pitting of the stainless steel as well as the generally offensive appearance and odor found in the prior art.

BRIEF DESCRIPTION OF THE DRAWINGS

FIG. 1 is a longitudinal section through the assembled membrane and container.

FIG. 2 is an enlarged detail showing the bleed hole in the skirt of the end cap.

FIG. 3 is a still greater enlargement of the bleed hole.

FIG. 4 is a reduced scale end view of the assembly taken as indicated by line 4—4 in FIG. 1 and illustrates the manner in which the end cap is fixed in the tube.

FIG. 5 is a reduced section taken on line 5—5 in FIG. 1 to show the end of the membrane assembly itself.

DETAILED DESCRIPTION OF THE DRAWINGS

The membrane assembly 10 is tubular and is provided with end fittings 12. Each end 12 has a multiplicity of holes 14 around a central tube 16 projecting axially from each end of the membrane. Inside the membrane assembly 10 are multiple layers in the annular space between the outside of the membrane and the central passage 18. Sea water is applied at one end of the assembly into the annular space and is extracted from the annular space at the other end of the assembly. Fresh water, i.e., desalinated or potable water comes out in the conduit 18 running the length of the assembly.

The tube 16 projecting from each end of the membrane assembly is received in a cooperating cylindrical recess 20 in the end cap 22. Seal 24 in the cylindrical recess 20 seats against the tube 16 to prevent leakage around the outside of the tube 16. Each end cap 22 is sealed with respect to the inside wall of the tubular container 24 by means of an O-ring 26. The membrane 10 is sealed with respect to the inside of the skirt 28 of the end cap 22 on the right of FIG. 1 by means of seal 30. The left-hand end cap does not have such a seal.

Each end cap 22 is retained in the tubular container 24 by two spaced parallel crosspins 32, 32 which pass through the corresponding holes in the end cap and holes in the tube. The pins are retained in position by means of the hairpin retainer clips 34. Each end cap is provided with two passages; a central passage 36 on the axis of the end cap having a threaded end for connection into the reverse osmosis system and an offset passage 40 between the cross pins 22. Either of the central passages 36 can serve as the outlet and the other of the passages 36 is closed with a plug 38 as shown on the right-hand end of FIG. 1. On the right end of FIG. 1, the offset passage 40 serves as the inlet for sea water or brackish water. This water passes through the passages 14, 14 in end wall 12 of the membrane and enters the membrane system inside the cartridge 10. The sea water flows through the system axially from the right in FIG. 1 to the left and exits through offset passage 40 in the end cap 22 on the left end of the membrane. Clear water passes into the tubular center 18 of the assembly and will, in FIG. 1, pass through the left end of the membrane via tube 16 into passage 36 and out of the threaded outlet 42. The plug 38 in the right end of passage 36 prevents flow to the right. The outlet could just as well be at the right end of the assembly.

Typically, sea water will enter the right end through passage 40 at about 820 psi and will exit the outlet 44 at about 800 psi. Thus there is a 20 psi drop from inlet to outlet going through the membrane. Since there is no seal between the left end of the membrane 10 and the left end cap 22 the 800 psi brackish water will fill the space 46 between the tube 24 and the membrane 10. The Pressure differential from inside the membrane to space 46 is minimal. There is nothing to cause any flow in space 46 in the usual arrangement and therefore the water in that annular space 46 will be stagnant. This stagnant condition gives rise to the algae growth which, as mentioned above, is not desireable.

There is a 20 psi difference between the head space to the right of the cartridge 10 and the annular space 46 between the cartridge and the tube. I have found that a small bleed hole 50 in the skirt 28 on the high pressure side of the seal 30 will allow enough flow to cause enough circulation or flow in the annular space 40 between the cartridge and the tube and prevent build up of algae in this annular space. A 0.025 inch hole will provide sufficient circulation to prevent the algae build up. This very small hole with only 20 psi differential across the hole provides only a limited bleed, but the flow rate is enough for the purpose and results in a markedly superior performance. The small bleed permits use of a stainless steel tube which is highly desireable in this environment. There is no obnoxious build up of the slime on the system, and servicing the system is no longer the repulsive drill required by the prior art.

I claim:

1. A reverse osmosis assembly comprising,
    a tubular container having a liquid inlet, a liquid outlet and a clear product outlet, an end cap mounted in each end of said container, means sealing each end cap with respect to the inside wall of said container, each end cap having a central opening, a reverse osmosis membrane having a central tubular passage with a tubular projection at each end of the membrane, each said projection being received in said central opening of the associated end cap and sealed with respect thereto, the central passage through one of said end caps being sealed so the central passage through the other end cap serves as a clear product outlet, a sea water inlet in said one of said end caps communicating with the membrane in said tubular container, said one end cap including an annular skirt lying between said membrane and said tubular container, first seal means between said membrane and said skirt preventing flow of liquid from said sea water inlet into the space between said membrane and said tubular container, a sea water outlet in the other of said end caps and communicating with said membrane to receive and discharge sea water which has passed through the membrane, there being no seal between said sea water outlet and said tubular container whereby the pressure in the space between the membrane and the tubular container is generally comparable to that within the membrane, and a bleed hole in said skirt on the inlet side of said first seal means and leading between said sea water inlet and the space between said skirt and said tubular container to allow liquid flow from said inlet through the bleed hole to the space between said skirt and said tubular container and then axially of said container in the space between the membrane and the container.

* * * * *